(12) United States Patent
Sudhaakar et al.

(10) Patent No.: US 9,059,929 B2
(45) Date of Patent: Jun. 16, 2015

(54) RELIABLE ON-DEMAND DISTRIBUTED DATA MANAGEMENT IN A SENSOR-ACTUATOR FABRIC

(75) Inventors: Raghuram S. Sudhaakar, Mountain View, CA (US); Sateesh K. Addepalli, San Jose, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 13/524,481

(22) Filed: Jun. 15, 2012

(65) Prior Publication Data
US 2013/0336316 A1 Dec. 19, 2013

(51) Int. Cl.
*H04L 12/56* (2006.01)
*G06F 17/30* (2006.01)
*H04L 12/761* (2013.01)
*H04L 12/753* (2013.01)
*H04W 40/20* (2009.01)
*H04L 12/725* (2013.01)

(52) U.S. Cl.
CPC ............... *H04L 45/16* (2013.01); *H04W 40/20* (2013.01); *H04L 45/306* (2013.01); *H04L 45/48* (2013.01)

(58) Field of Classification Search
USPC .......... 370/390, 329, 310, 375, 400; 455/458, 455/445, 510
See application file for complete search history.

(56) References Cited

U.S. PATENT DOCUMENTS

| | | | |
|---|---|---|---|
| 7,187,683 B1 | 3/2007 | Sandoval et al. | |
| 7,457,835 B2 | 11/2008 | Toebes et al. | |
| 7,822,808 B2 * | 10/2010 | Caplan et al. | 709/203 |
| 7,844,212 B1 * | 11/2010 | Woo et al. | 455/3.01 |
| 7,979,531 B2 | 7/2011 | Krishnaswamy | |
| 8,108,713 B2 | 1/2012 | Turner et al. | |
| 8,381,024 B2 | 2/2013 | Turner et al. | |
| 2007/0124437 A1 | 5/2007 | Chervets | |
| 2007/0150565 A1 * | 6/2007 | Ayyagari et al. | 709/223 |

OTHER PUBLICATIONS

Winter, et al., "RPL: IPv6 Routing Protocol for Low-Power and Lossy Networks", Internet Engineering Task Force, Request for Comments 6550, Mar. 2012, 157 pages.

* cited by examiner

*Primary Examiner* — Edan Orgad
*Assistant Examiner* — Sithu Ko
(74) *Attorney, Agent, or Firm* — Parker Ibrahim & Berg LLC; James M. Behmke; Stephen D. LeBarron

(57) ABSTRACT

In one embodiment, a system comprises a plurality of minimalistic data collection nodes in a computer network, the minimalistic data collection nodes configured to generate sensed data values of a particular type and to communicate the data values within the computer network in substantially real-time using distributed data acquisition (DA) packets specific to the particular type of the data values. The system also comprises a plurality of capable data collection nodes in the computer network, the capable data collecting nodes configured to store the data values of the minimalistic data collection nodes from the DA packets. One or more points of use of the system may be configured to request the data values, wherein one or more particular capable data collection nodes of the system are configured to service the request in substantially real-time on behalf of the minimalistic data collection nodes with the stored data values.

20 Claims, 9 Drawing Sheets

RELIABLE ON-DEMAND DISTRIBUTED DATA MANAGEMENT IN A SENSOR-ACTUATOR FABRIC

TECHNICAL FIELD

The present disclosure relates generally to computer networks, and, more particularly, to distributed data management in sensor-actuator fabrics (e.g., to "smart grid" technologies).

BACKGROUND

Recent trends indicate that the future will progress towards sensor-actuator based automation in various sectors including buildings, communities/cities, transportation, energy, etc. Experts predict that in the coming decades there will be a fabric of trillions of sensor-actuator devices embedded into our surroundings. This fabric will bring about integrated automation that will greatly improve the efficiency of the environment and/or resources as well as the quality of living for those within the environment.

Today, accessing (reading and writing) from/to a sensor-actuator is accomplished using various IP accessing techniques such as Web Services (e.g., the known "Restful API" including optimized versions of it such as the constrained application protocol (CoAP) along with IPv6 over Low power Wireless Personal Area Networks (6LoWPAN), etc.) via gateway routers using end-to-end IPv6 approaches where data could be gathered form a central location or using a hierarchical approach with remote agents hosted on edge routers. However, these techniques require some level of synchronization as well as multi-hop routing control protocols among sensors/actuators in a given sensor-actuator fabric cluster, in order to provide access paths between an edge gateway router (or border router) and a sensor/actuator of interest. This is not always not feasible, because all sensors/actuators in a given sensor-actuator grid are not created equal in terms of cost/power/performance/processing power/radio link availability/etc. Furthermore, new architectures are emerging consisting of using minimalistic connected objects (MCOs), thus reducing complexity in avoiding the support of complex protocols in a low power and lossy network (LLN). Moreover, the sheer volume of data generated by the sensors/actuators in a sensor-actuator fabric cluster may make it infeasible for the data to be transmitted to/from the gateway router. Indeed, low power data links usually only provide a few Kbits/s of bandwidth (e.g., power-line communication (PLC) and wireless/radio frequency (RF) shared-media protocols), and will not likely be able to carry large amounts of traffic, not to mention limitations when using battery-operated devices. In other cases, it might be useful for the user to obtain/set data on-demand as it preserves the relevancy of the data with respect to time and location.

In addition, another aspect of the typical sensor-actuator fabric is that the sensors/actuators form an arbitrarily connected network in which the quality of the link between any two sensor/actuator nodes may degrade randomly. This may cause complete loss of the links or severe errors, resulting in path unavailability between the requesting gateway router or central controller (e.g., a network management server (NMS)) and the target sensor/actuator.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
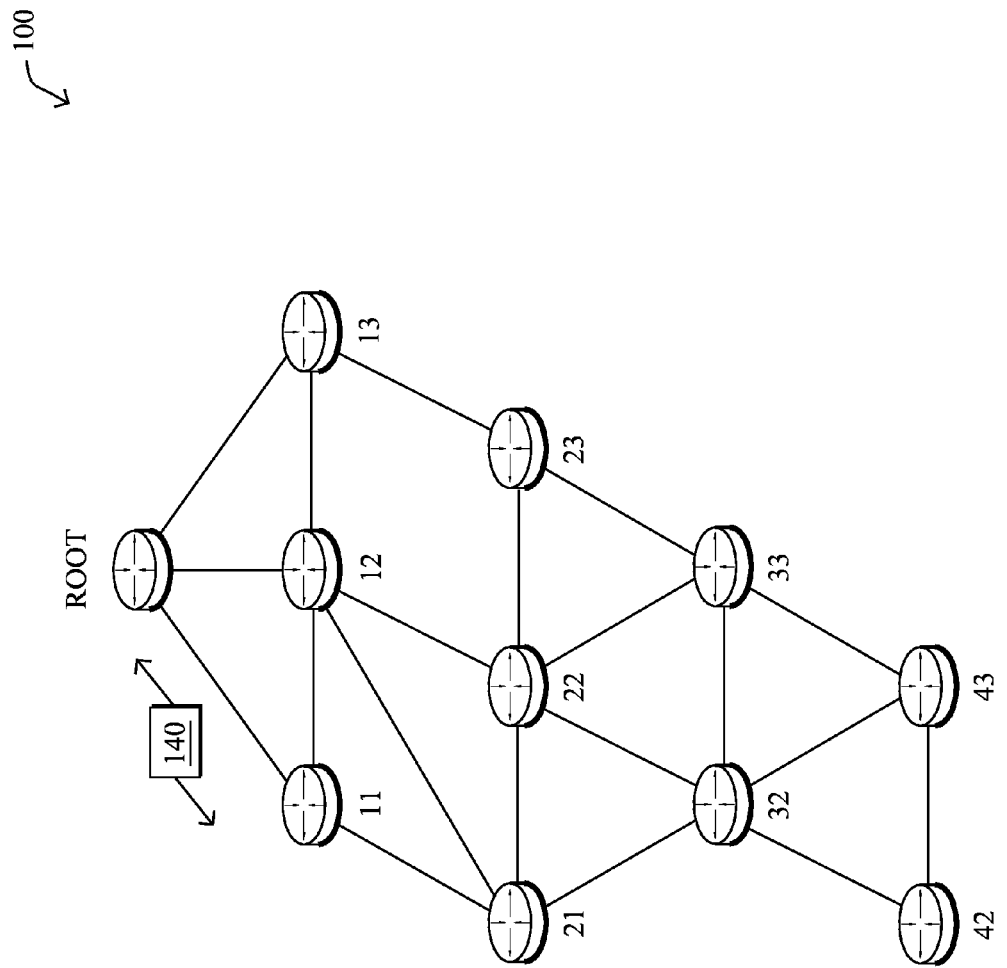
FIG. 1 illustrates an example communication network.

According to one or more embodiments of the disclosure, a system comprises a plurality of minimalistic data collection nodes in a computer network, the minimalistic data collection nodes configured to generate sensed data values of a particular type and to communicate the data values within the computer network in substantially real-time using distributed data acquisition (DA) packets specific to the particular type of the data values. The system also comprises a plurality of capable data collection nodes in the computer network, the capable data collecting nodes configured to store the data values of the minimalistic data collection nodes from the DA packets. One or more points of use of the system may be configured to request the data values, wherein one or more particular capable data collection nodes of the system are configured to service the request in substantially real-time on behalf of the minimalistic data collection nodes with the stored data values.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12,"... "43," and described in FIG. 2 below) interconnected by various methods of communication. For instance, the links 105 may be wired links or shared media (e.g., wireless links, PLC links, etc.) where certain nodes 200, such as, e.g., routers, sensors, actuators, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
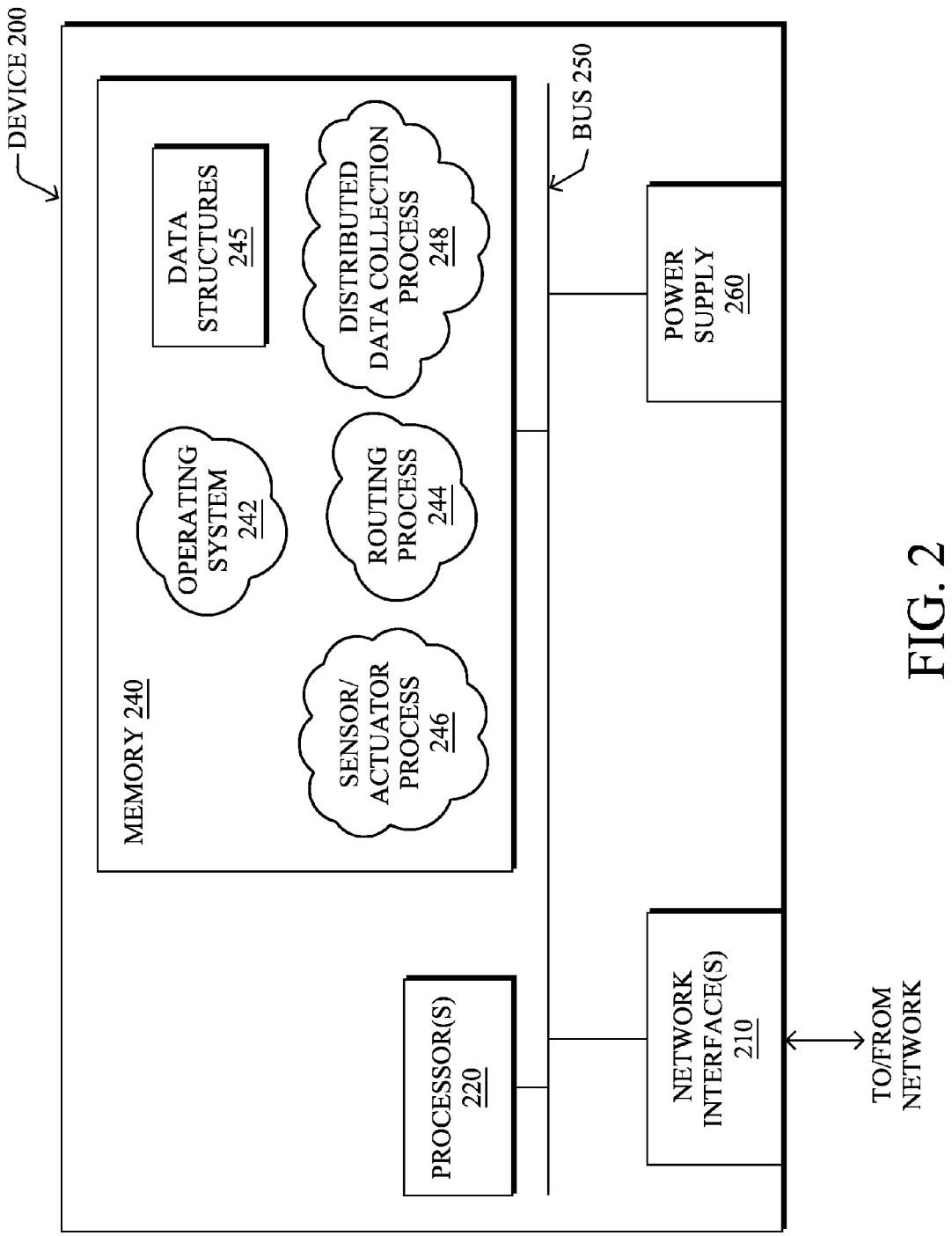
FIG. 2 illustrates an example network device/node.

FIG. 2 is a schematic block diagram of an example node/device 200 that may be used with one or more embodiments described herein, e.g., as any of the nodes/devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using one or more different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a sensor/actuator process 246, and an illustrative distributed data management process 248, as described herein. Note that while the processes are shown in centralized memory 240, alternative embodiments provide for one or more of the processes to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

As noted above, accessing (reading and writing) from/to a sensor-actuator is currently accomplished using techniques that require some level of synchronization as well as multihop routing control protocols in order to provide access paths between an edge gateway router (or border router) and a sensor/actuator of interest. This is not always not feasible, because all sensors/actuators in a given sensor-actuator grid are not created equal in terms of cost/power/performance/processing power/radio link availability/etc., particularly in LLNs as described above. Furthermore, new architectures are emerging consisting of using minimalistic connected objects (MCOs), thus reducing complexity in avoiding the support of complex protocols in a low power and lossy network (LLN). Moreover, the sheer volume of data generated by the sensors/actuators in a sensor-actuator fabric cluster may make it infeasible for the data to be transmitted to/from the gateway router.

Distributed Data Management for Sensor Networks

The techniques herein propose an architecture for data collection in highly constrained network where collection packets are originated that trigger the collection of data of Type X and are either broadcasted or multicasted along a dynamically formed multicast tree. The data of interest may then be gathered and stored thanks to a distributed algorithm in more capable devices using various mechanisms according to the node capability and/or the network state. Requests may then be consumed by nodes having stored sufficiently fresh information, using the network as the database without being further processed by the network. For example, a sensor-actuator (S-A) fabric system may allow a requesting device (e.g., a mobile device) to directly query/request (e.g., in a peer-to-peer manner) any sensor/actuator node within the S-A fabric for information about a target sensor/actuator in the S-A fabric, without needing to reach the target sensor/actuator at the time of query/request. In other words, the techniques herein use the network itself as a distributed database to store information in the network.

Specifically, according to one or more embodiments of the disclosure as described in detail below, the techniques herein provide a system that comprises a plurality of "minimalistic" data collection nodes in a computer network, the minimalistic data collection nodes configured to generate sensed data values of a particular type and to communicate the data values within the computer network using distributed data acquisition (DA) packets specific to the particular type of the data values. The system also comprises a plurality of "capable" data collection nodes in the computer network, the capable data collecting nodes configured to store the data values of the minimalistic data collection nodes from the DA packets. One or more points of use of the system may be configured to request the data values, wherein one or more particular capable data collection nodes of the system are configured to service the request on behalf of the minimalistic data collection nodes with the stored data values.

Illustratively, the techniques described herein may be performed by hardware, software, and/or firmware, such as in accordance with the distributed data management process 248, which may contain computer executable instructions executed by the processor 220 to perform functions relating to the techniques described herein, e.g., to manage the distributed data in accordance with the techniques described below (in conjunction with routing process 244). For example, the techniques herein may be treated as extensions to conventional protocols, such as the various PLC protocols or wireless communication protocols, and as such, may be processed by similar components understood in the art that execute those protocols, accordingly.

Operationally, the techniques herein provide an architecture for data acquisition (DA) in highly constrained networks whereby DA packets that trigger the collection of sensed data (e.g., voltage, current, power, temperature, phasors, and the like) may be either broadcast or multicast along a dynamically formed multicast tree. The data values may then be gathered and stored by distributed algorithms in more capable devices (e.g., capable data collection nodes), using processes that may vary according to node capability and/or the network state. Requests may then be consumed by nodes comprising information/data that is sufficiently current (i.e., not too dated), effectively using the network as a distributed database, without the data necessarily being further processed by the network.

The DA protocol ensures that the data generated by each node may be propagated within the network to all relevant nodes. In this protocol, certain high functionality nodes (capable data collection nodes, e.g., devices with local storage or data collection services) within the network that are able to perform database operations (e.g., local storage capabilities or associated distributed database) may cache the data. This allows future queries/requests pertaining to the same data to be served by these high functionality nodes, so that the query need not be propagated to the target node. The techniques herein may allow the sensor network (sensor-actuator fabric) to function as a distributed database that may be interrogated, for example, by using complex expression queries that are served by one or more capable nodes within the network. Moreover, the techniques described herein, unlike those of the conventional art, may also be applied to highly constrained networks such as, for example, low power lossy networks (LLN), which are frequently associated with portions of the sensor fabric. For example, using a combination of the above described techniques, the distributed database created by the high functionality nodes (e.g., capable data collection nodes), which may act as an overlay of more-capable storage devices within the LLN, may be maintained so that stored data values are extremely close to real-time. This allows certain applications/functions/processes to utilize the data in substantially real time without the need to directly contact the relevant target nodes (e.g., minimalistic data collection nodes within the sensor fabric). In other words, it is not necessary for the specific target sensors in the fabric to be awake, or available, at the time the data request is generated by those application/function/process.

Advantageously, the described techniques allow high functionality nodes to generate expression-based queries. For example, such an expression-based query may use data from a specific subset of sensors or nodes, or enable data computation to occur simultaneously with data collection. Expression-based queries may be very powerful in situations such as, for example, a heterogeneous sensor fabric (e.g., comprising both constrained and non-constrained network nodes) that needs to be monitored for various streams of information. The techniques herein also allow network performance to be adjusted so that it is either proactive or reactive, which allows for flexible control operation in which parameters such as, for example, energy consumption, frequency management, and the like, may be finely tuned to desired operational specifications.

According to one or more embodiments of the techniques herein, data acquisition may occur via a pull-based method in which a requesting node (e.g., a data collection agent, data collection service device, etc.) issues a query DA packet to get information from the sensor network/fabric, which results in the query propagating across the sensor network/fabric and collecting updated data from sensors. The DA packets may then propagate the collected information back to the requesting node, and any other high functionality nodes that host the distributed database. Data acquisition may also occur via a push-based method in which a sensor generates new data, wakes up, and injects a DA packet comprising current sensor data values into the network to propagate the new data across the sensor network/fabric.

Figure 3:
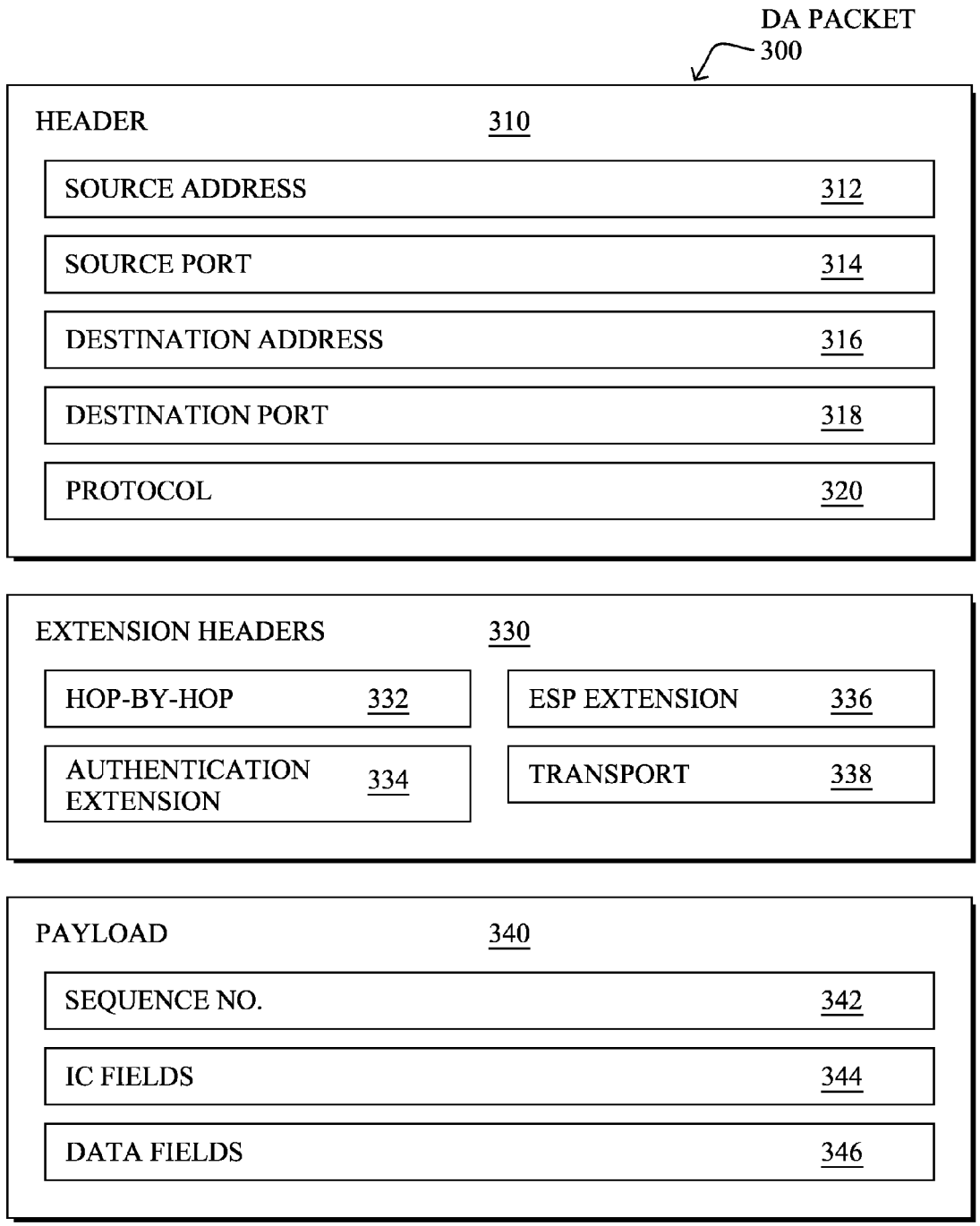
FIG. 3 illustrates an example format of a data acquisition (DA) packet.

The DA packet may be a newly defined IPv6 packet designed to collect and disseminate data in the sensor fabric. As shown in FIG. 3, DA packet 300 contains header 310, one or more optional extension header(s) 330, and payload 340. Header 310 is used by network-capable devices to route/forward the DA packet 300 and its associated payload 340, and illustratively comprises a source address 312, source port 314, destination address 316, destination port 318, and a protocol 320. Other fields, flags, labels, sub-headers, etc., may also be present, but are not shown for clarity. DA packet 300 may further comprise one or more optional extension headers 330 (e.g., a hop-by-hop header 332, an authentication extension header 334, an ESP header 336, a transport header 338, and the like). Payload 340 may comprise a variety of fields including, but not limited to, a sequence number field 342, an information content (IC) field 346, and one or more pre-allocated data fields 346 to acquire the local data of one or more nodes (e.g., sensors) in the network. The IC field 344 of a DA packet 300 may be defined as the number of pre-allocated data fields 346 containing data from unique nodes/sensors that the packet contains at any given time. DA packet 300 may have complete information when all its pre-allocated data fields 346 have been populated with data from the one or more nodes in the network. IC field 344 is of variable length, made of type-length-value fields (TLVs) so that each node/sensor may report its information (sensed value) along with optional time and location. In one embodiment, the destination address 316 may comprise a unique unknown destination address, which is analogous to having the destination address be unspecified. This facilitates data collection in situations where, for example, data must be collected from all nodes within the network, or sub-network, or when a requesting node seeks the value of a data variable of type X, without knowing where that particular data value has been localized/stored within the network/sensor fabric.

Data Acquisition: Pull Protocol

In one illustrative embodiment, data acquisition may occur via a pull-based method. Illustratively, when data is needed, a DA packet 300 may be injected into the network by the requesting node, which may be inside the LLN, the LLN border router (LBR), or any other node/sensor of the sensor fabric. Individual nodes/sensors that are contacted by DA packet 300 may then add their local data to data fields 346, and forward the DA packet 300 to another node/sensor within the sensor fabric in order to propagate it through the network. The DA packet 300 may either be broadcast in the absence of a routing protocol, or multicast along a routing topology. In general, the size of the data at any given node/sensor is only a few bytes, which allows data from all the nodes in the network, or sub-network, to be contained in DA packet 300.

The techniques herein provide that DA packet 300 may enable complex queries. For example, the requesting node may inject a DA packet 300 into the network that does not collect all data of a particular type from all nodes/sensor within the network. As another example, the DA packet 300 may enable a query to provide the highest value of data of type X, in which case, a node/sensor may replace the data value in a data field 346 with the local node/sensor data value, if it is higher. When a node/sensor receives a DA packet 300 containing information about other nodes/sensor in the network, it may store the new information locally. In other words, the DA packet 300 may be used to collect information/data in the network, and disseminate the information/data to more capable/higher functioning nodes. To generate expression-based queries, the DA packet 300 may be injected into the network with a condition set that is evaluated during the propagation of the DA packet 300 by each contacted node/sensor, which will compute the expression or condition set provided in DA packet 300 before adding its local data to the DA packet 300 (e.g., if X exists, compute the expression and condition set: if true perform step Y, else continue to step Z).

DA packet 300 may be propagated by at least two techniques. In one example, broadcast transmission may be used to propagate the DA packet through the sensor fabric (e.g., the LLNs). This technique eliminates the need for topology information and the overhead of a routing protocol; however, it has to cope with packet losses due to an unreliable wireless/PLC medium. Broadcasting the DA packet means that an acknowledgment (ACK)-based feedback mechanism may not be used to confirm successful DA packet delivery due to an ACK flooding problem. Instead, a retransmission technique may be executed independently by each node to ensure that network flooding does not occur, yet provide sufficient confidence to the sender that packet has been reliably delivered to the nodes within its range. In a second example, if the network makes use of a routing protocol that supports multicast, the requesting node may decide according to the frequency at which it gathers data of type X, to set up a multicast tree that is used by the nodes capable of generating data of type X to join the tree. Notably, in one example embodiment, a multicast tree comprising capable sensors/nodes could be established on a "per-type of data" basis.

In accordance with one example embodiment to propagate a DA packet, the techniques herein provide a point of use device, or a data request generator (DRG) that originates a query by injecting an empty DA packet in the network (e.g., a DA packet with all the data fields initialized to null). If the DRG is attached directly to the local network (e.g., LLN), the DA packet may be either broadcast or multicast, as described above. If the DRG is outside of the network, the DA packet may be first encapsulated into a tunnel connected to a sensor/node within the LLN or the LBR (e.g., an LLN border router connecting the LLN to the "classic" IP network). If the DA packet contacts a sensor/node that serves the same type of data collected by the DA packet, the node/sensor may take a snapshot of the DA packet's local data, add its own local data to the DA packet, and store a local copy of the updated DA packet. When using the broadcast mode of operation, upon receiving a DA packet for the first time, a node may immediately broadcast the updated DA packet and starts its re-broadcast (RB) timer. When a node receives a DA packet subsequently, it updates its locally stored copy with information from the packet, and restarts its RB timer based on the IC field. In this way the DA packet is propagated over the multi-hop sensor fabric while the IC field of the locally stored DA packet is monotonically increased at each node contacted by the DA packet. Alternatively, the maximum number of broadcasts that each node can attempt may be fixed. However, it should be noted that the time between retransmissions may significantly affect performance, and arbitrary retransmissions may potentially lead to flooding or data starvation in the network. The timeout value for the RB timer plays an important role in the number of messages transmitted and the time taken to collect the global data. In other words, the RB timer is a novel information content based timer that may dynamically change the retransmission schedule of each node. The RB timer has no overhead, and is calculated independently at each node based only on local information. By using the RB timer to schedule the retransmissions at each node, the techniques herein create a controlled broadcast technique that satisfies the seemingly conflicting requirements of ensuring reliable packet delivery while avoiding network flooding.

Illustratively, each sensor/node may follow rules to operate the RB timer. For example, whenever the local information at a node is updated, the node may stop any existing RB timer and start a new RB timer. Additionally, upon expiration of the RB timer, a node may immediately broadcast its local information and restart the RB timer. The RB timer's timeout should be designed to find a balance between liberal and conservative timeout values. For example, the RB timer's timeout value should be designed to avoid small timeouts, which have the potential to cause flooding in the network because they lead to frequent retransmissions. However, a timeout value that is too conservative may lead to the DA packet propagating slowly through the network, which may cause significant delays in data collection. The goal is to improve the probability of the DA packet propagating to all the nodes in the network in the shortest time possible, while maximizing information content at each node. Hence it is advantageous to retransmit a packet that has more information content as soon as possible to maximize the information content of other nodes.

As noted above, a multicast technique may also be used to forward the DA packet. For example, the DA packet may be forwarded along a multicast tree of interest according to the type of the data that is requested. For example, as may be appreciated by those skilled in the art, a multicast tree may be established where nodes/devices interested in or capable of providing a particular type of data are configured to join a particular multicast "group" in order to distribute that particular type of data to only those other nodes/devices having joined the same group.

Illustratively, when the DA packet is received by a node along the multicast tree, the node may either poll its local sensor to gather the data of interest (e.g., current temperature) or retrieve a previously stored or cached data value if the information is still sufficiently fresh, which may optionally be contained in the DA packet. If the node is not a leaf node of the multicast tree, it may store the data for a period of time T, and forward the DA packet along the multicast tree. If the DA packet reaches a leaf node of interest in the multicast tree, it may arm a timer T_send that is inversely proportional to the path cost value from the leaf node to the requesting node. Upon expiration of the timer T_send, the sensed data value may be forwarded along the multicast tree in the opposite direction (i.e., toward the requesting node). Nodes along the multicast tree may then process the DA packet and add their own value(s), or potentially process the data and add the processed data value. For example, a node in the multicast tree may receive data from its sub-nodes, and may fuse data to the received data before adding the data value to the data field (e.g., the use of inversely proportional timers allows nodes deeper in the multicast tree to send their data first). Before the DA packet is forwarded to the requestor, if the forwarding node is capable of storing the time-stamped value of type X, then the value may be stored locally to process future requests.

In yet another embodiment, if the requestor is looking for data of type X, regardless of its location in the network (e.g., find the highest pressure in area X), a node receiving the DA packet and having collected the data of type X in the past, or having that data currently, may simply drop the DA packet and send the value back to the requestor, or send it back along the multicast tree to the requestor, which may then stop the data collection process.

Data Acquisition: Push Protocol

The techniques herein also provide that data collection may occur via a push-based method, in which a sensor generates new data, wakes up, and updates the distributed database by propagating the updated information across the sensor network/fabric. In such a scenario, the sensor node may wake up and inject a push packet with its data fields already filled out with the sensor's new data. This new information will propagate in the same method described above to high functionality nodes that host the distributed database (e.g., capable data collection nodes). The individual sensors/nodes may make use of a low-pass filter to only inject a new push packet if the sensor's/node's information has substantially changed since the last data update (e.g., the requested degree of sensitivity may have been provided by the requestor in the novel IPv6 DA packet). This new information will propagate using the same methods (broadcast or multicast) described above for high functionality nodes that hosts the distributed database. Advantageously, this allows the network performance to be either proactive or reactive. In other words, the sensors/nodes may update the database as soon as they have new data, or data may be pulled from the sensor/node only when a query arrives. This allows flexibility to tune other parameters such as energy consumption, frequency management, etc.

Distributed Storage

The techniques herein also provide efficient distributed storage of data. For example, as discussed above, the sensor fabric may comprise high functionality devices able to store data and perform data analysis (e.g., time series analysis). These devices have a storage capability greater than the sensor devices, but much lower than dedicated database/storage devices. Hence, they store data from sensor devices that are geographically in their proximity. Storage devices may be configured to store data from sensor devices based on certain logical functions. For example, a high functionality device may store data generated by only one type of sensor device, or store data aggregated over time based on pre-determined mathematical functions. (Note that in certain embodiments, one or more of the minimalistic data collection devices may also be configured as capable data collection devices; i.e., sensing and storing data values.)

Due to storage constraints of the high functionality devices, only relatively current data will typically be stored. If it is within preset bounds, the data is returned to the requestor immediately. In the event that the last available data is too old, then a broadcast/multicast based query may be initiated using the algorithm described above. In other words, the node may either send the latest cached information, or may alternatively decide to send a new DA packet that will gather data across the network and restore more current data on one or more capable nodes.

Since the sensor devices are resource constrained, they cannot store large amounts of data. In some cases, the sensor storage capabilities may be on the order of only a few bytes such as, for example, in the case of a passive RFID based sensor. To accommodate such situations, which will be prevalent in connected environments, the techniques herein provide that bitmaps and bit streams may be used to represent data. For example, the data formats may be converted at aggregation points into standard formats using bloom filters to check for the presence of data fields.

Illustratively, the DA packet may contain the location/address/name of the target in addition (as opposed to using an unknown IP destination address as described above) to the data type (e.g., "what is the temperature of distribution line X in area Y?"). As the DA packet is forwarded in the network using one of the methods described above, nodes process the request. If the query matches and the node is indeed associated with line X in area Y and is a temperature sensor, then the sensor/node adds its data value to the DA packet. The DA packet continues to propagate and contact all nodes in the network being broadcasted (no routing protocol) or multicasted (along the tree specific for the requestor's data query). When the DA packet is returned to the requestor, a more capable node may decide to cache the information (even if this is not a temperature sensor), along with an aging value. If a second requestor then sends a new DA packet, that node may then retrieve the stored data and return it to the requestor, and also stop forwarding the DA packet any further nodes/sensors, thus effectively using the network as a database. More capable nodes may perform data fusion in their database (e.g., the average temperature for all nodes in area Y is T).

In another embodiment, a sensor/node may decide when to cache data according to the resources available at the node (e.g., available memory) or the network state (e.g., a network management server (NMS) (e.g., an LBR) may provide some indicia on preferred data storage locations according to the network traffic conditions). For example, if the sensor/node has plenty of available memory, it may decide to cache all data that it sees in DA packets. On the other hand, if RAM or data storage in general is limited or running low, it may decide to store data if the frequency at which it sees DA packets for data of type X exceeds some threshold value. In other words, the techniques herein provide a decision process by which data may be stored based on a sophisticated condition set. For example, a sensor/node may only store data of type X from another node Y if the number of requests traversing the node exceeds a threshold value; if they do not, then storing the data locally is probably not an efficient use of resources. Furthermore, the NMS or LBR, which may assess network state/condition, may request a node to store data according to its location and network state in order to regulate the network traffic and help reduce network congestion.

Figure 4:
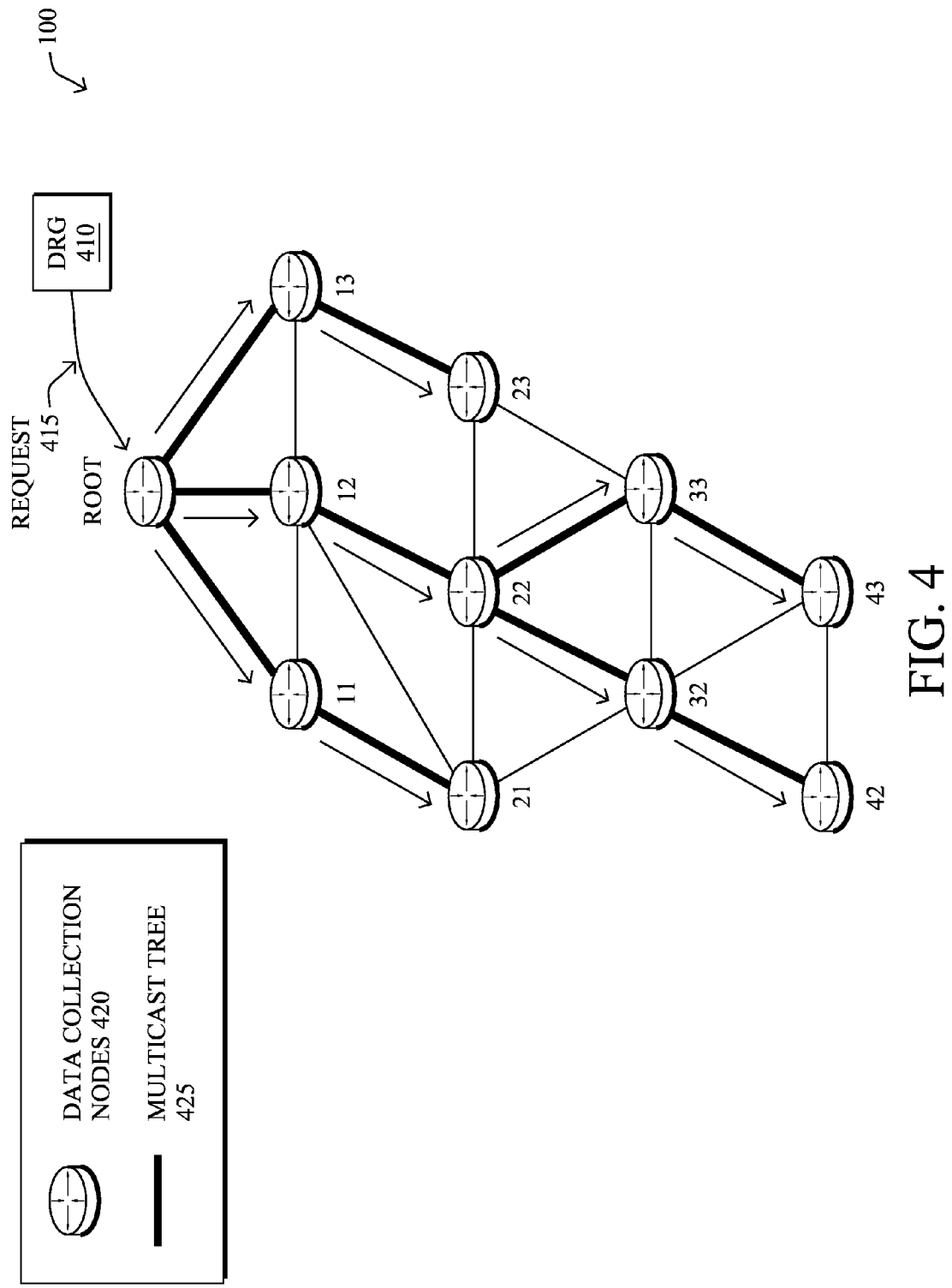
FIGS. 4-7 illustrate simplified examples of distribution of the DA packet.
Figure 5:
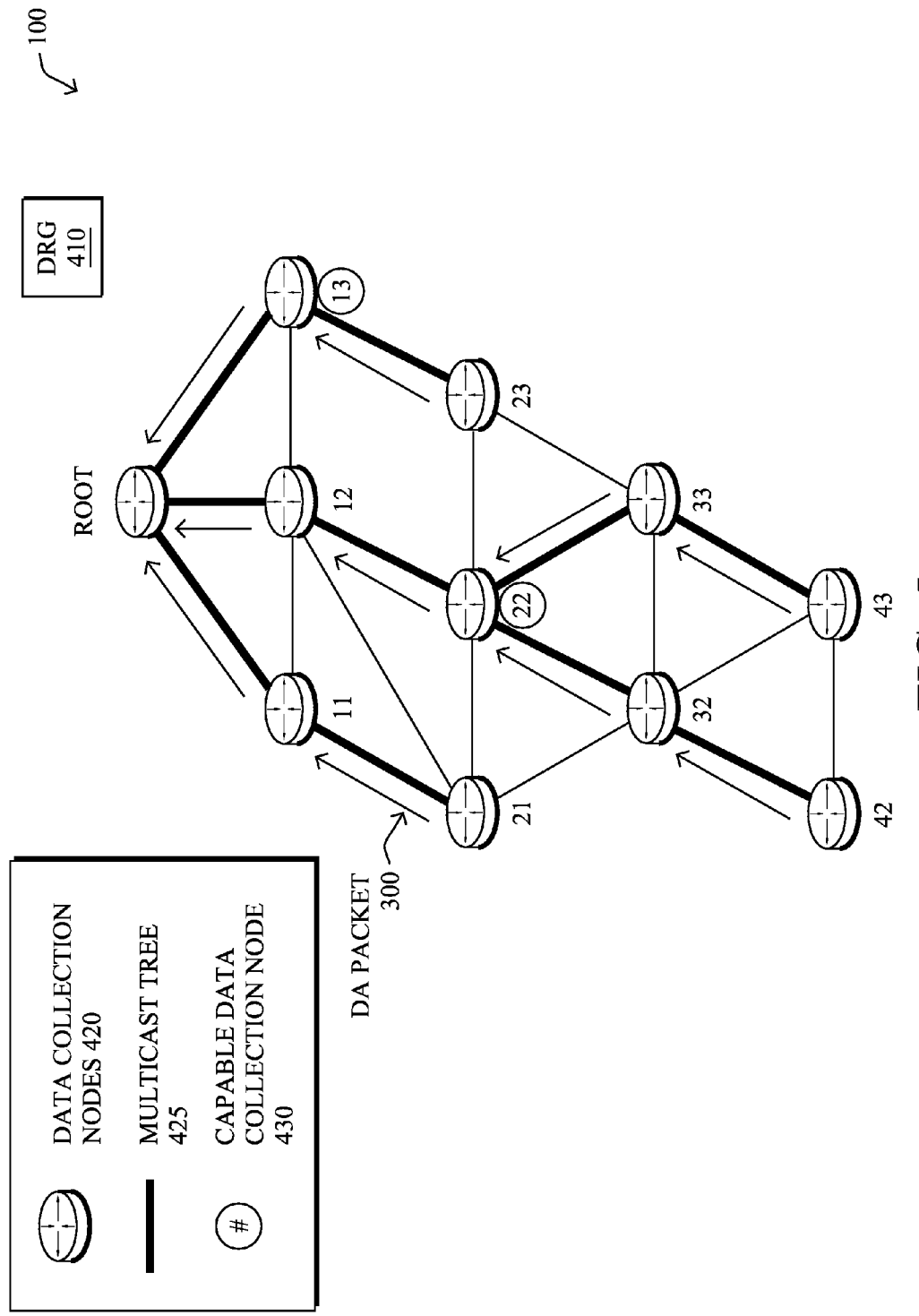
Figure 6:
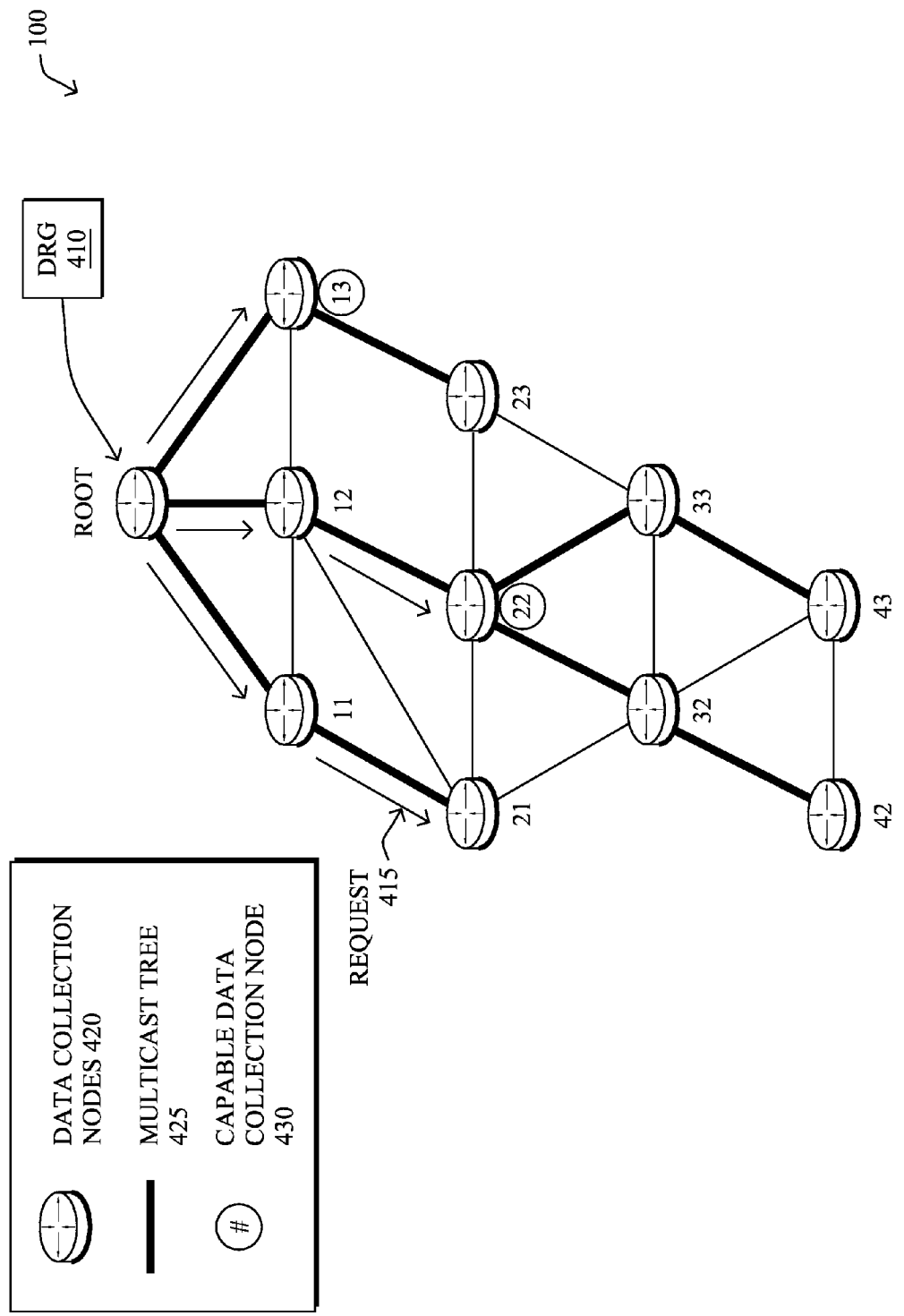
Figure 7:
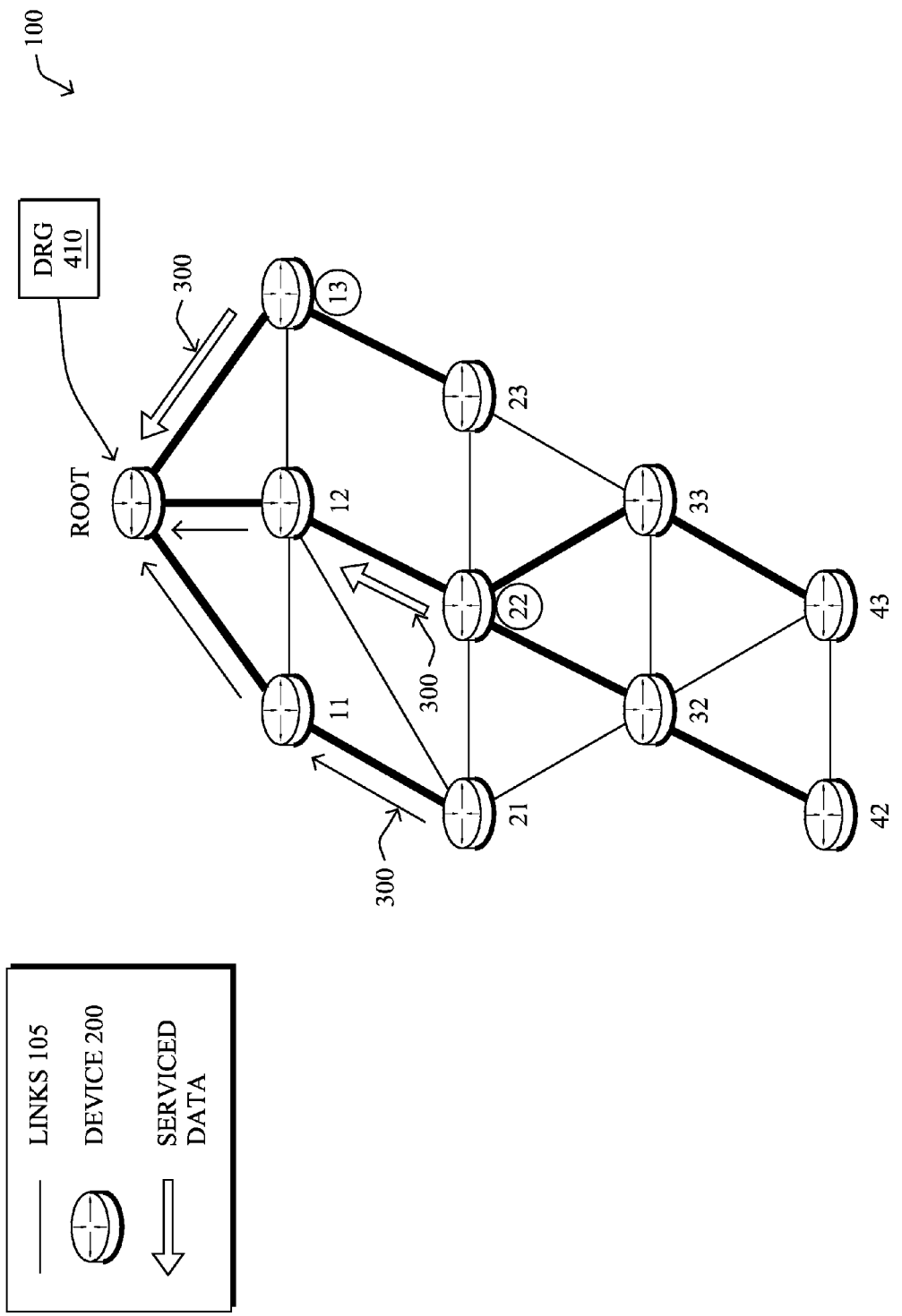

FIGS. 4-7 illustrate simplified examples of distribution of the DA packet 300 as described above. In particular, as shown in FIG. 4, one or more points of use or DRGs 410 may initiate a request 415 for data as a specifically formatted DA packet. This request 415 may propagate to a specific node or else to a plurality of data collection nodes 420, e.g., according to a multicast tree 425. In response, as shown in FIG. 5, the data collection node(s) return a DA packet 300 toward the DRG 410, and along the way, as noted above, more capable data collection nodes 430 may determine whether to store/cache the data for future use. Specifically, in the event another request 415 is received in the future as shown in FIG. 6 (or else in response to a timing-based push protocol), then in FIG. 7 the capable data collection node 430 may simply return the desired data values 435 (e.g., DA packet or specific response message), without having to query the actual sensor (e.g., minimalistic data collection node), which may be asleep, unreachable, etc.

Figure 8:
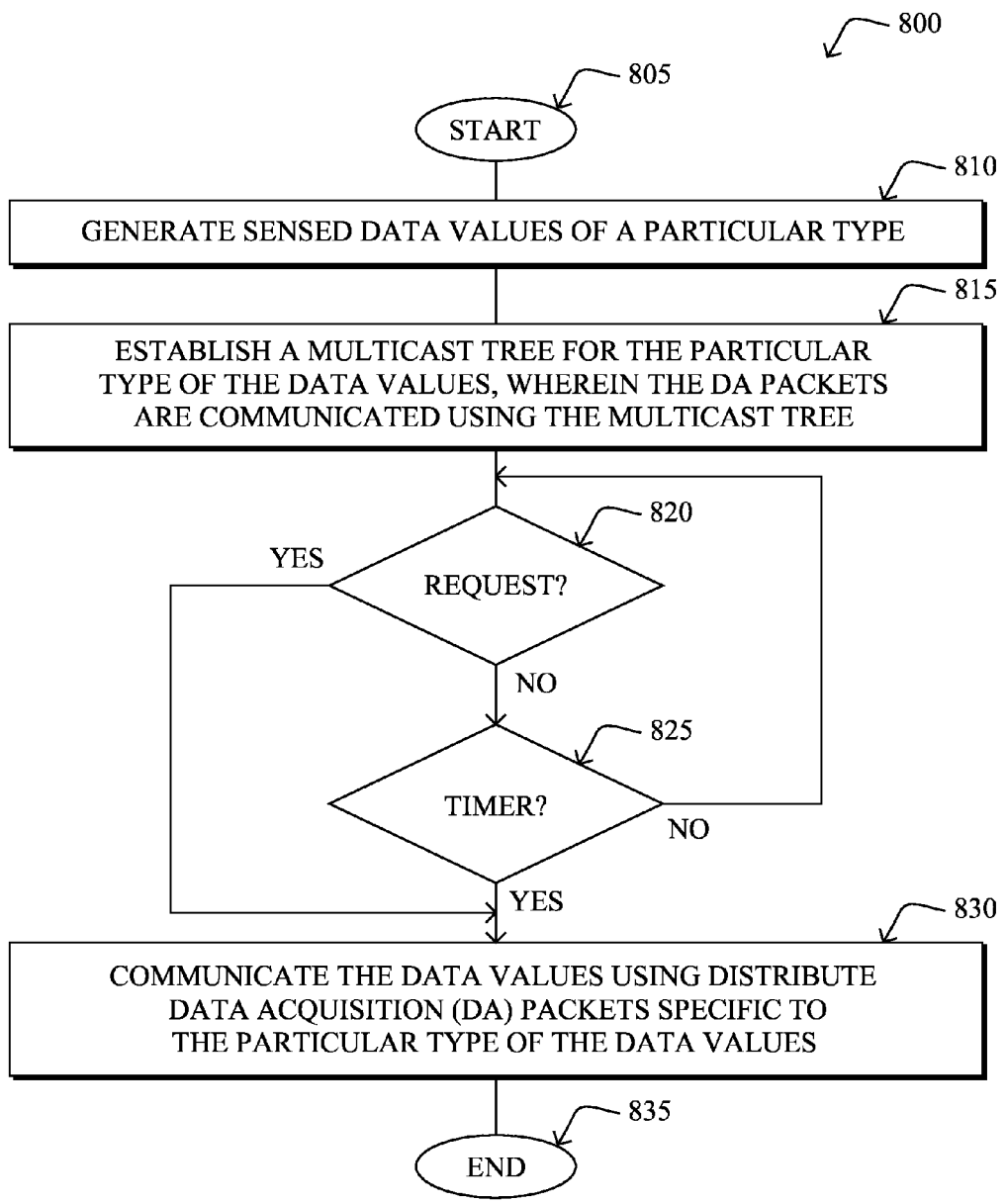
FIGS. 8-9 illustrate example simplified procedures for distributed data management in accordance with one or more embodiments described herein.

FIG. 8 illustrates an example simplified procedure 800 for distributed data management in accordance with one or more embodiments described herein, particularly from the perspective of a data collection node (e.g., minimalistic). The procedure 800 may start at step 805, and continues to step 810, where, as described in greater detail above, a data collection node in a computer network generates sensed data values of a particular type. In addition, in certain embodiments, in step 815 the data collection node may establish a multicast tree for the particular type of the data values. In response to either receiving a specific request in step 820, or else in response to a transmission timer in step 825, then in step 830 the node communicates the data values within the computer network using distributed DA packets 300 (specific to the particular type of the data values), and the procedure 800 ends in step 835, notably with the option to continue sensing data, receiving requests, pushing DA packets, etc., as described above.

Figure 9:
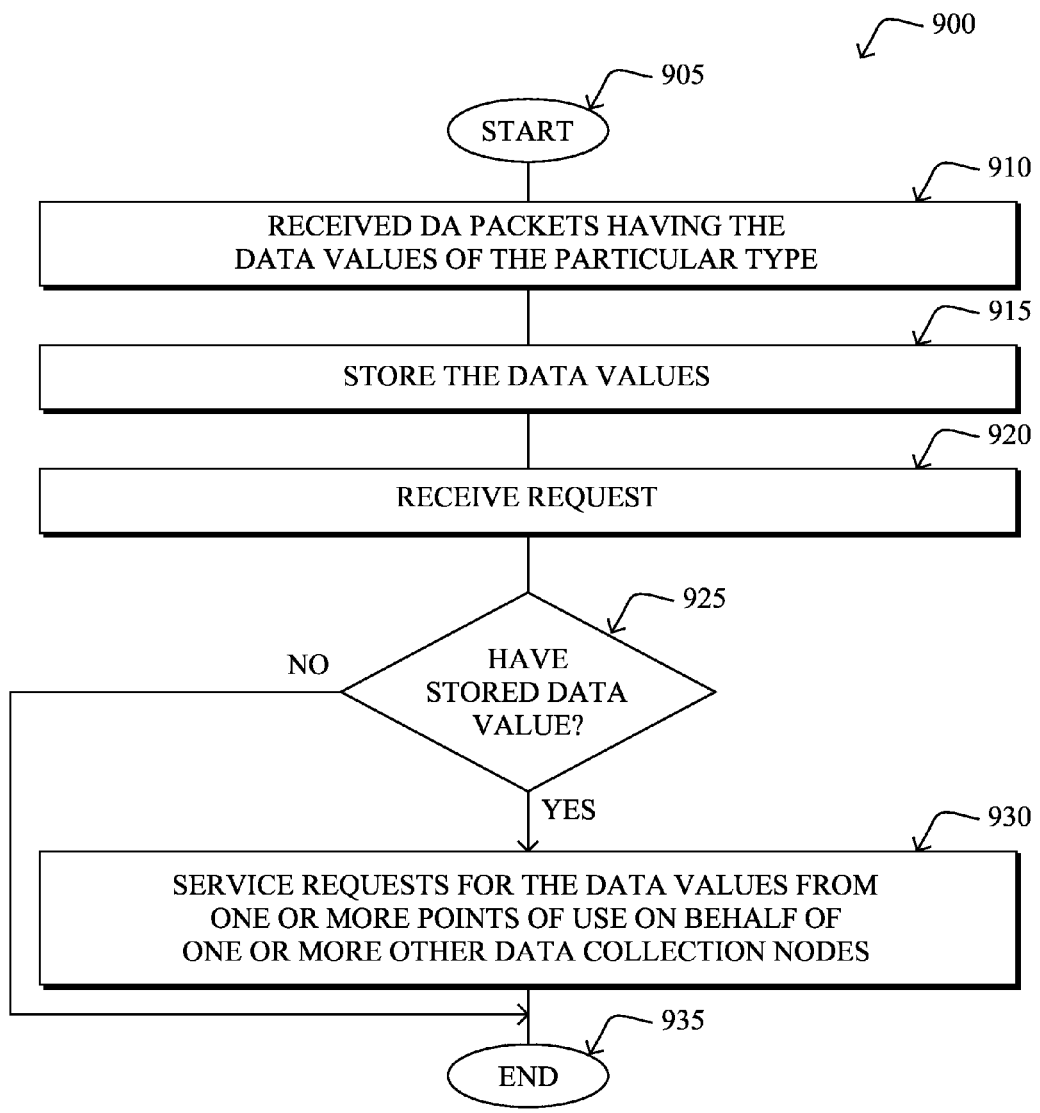

Moreover, FIG. 9 illustrates an example simplified procedure 900 for distributed data management in accordance with one or more embodiments described herein, particularly from the perspective of a data collection node (e.g., capable). The procedure 900 may start at step 905, and continues to step 910, where, as described in greater detail above, the capable data collection node receives DA packets having the data values of the particular type, which may be stored in step 915. In response to receiving a request in step 920 for the data values, and in response to determining in step 925 that the requested data values have been stored (e.g., recently), then in step 930 the capable data collection node may service the request for the data values on behalf of one or more other data collection nodes, accordingly. The procedure illustratively ends in step 935, notably with the ability to continue storing DA packet data and receiving requests from one or more points of use (DRGs).

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, provide distributed data management for sensor networks (e.g., a sensor-actuator fabric). In particular, the techniques herein may dramatically improve network energy utilization, efficiency, scalability, and latency because raw and processed sensor data is available for consumption by an application/process/user at the point of generation. Since the data does not need to be sent to one or more central processing entities and then returned to the application/process/user, the speed of data retrieval is increased (e.g., by local caching of sensed data that remains valid without having to reach a target), while network traffic is decreased (e.g., by storing sensed data in multiple nodes in a distributed fashion). This allows deployment of sensor networks without requiring infrastructure nodes to manage the sensor devices. Another advantage is that mobile users may query network information at any node in the sensor network, and be able to receive information from any other node, thus enabling the user to be truly mobile.

Illustratively, the distributed data collection methods described herein may also be extended to provide distributed phasor measurement unit (PMU) measurement at the distribution level. For example, line sensing of voltage and current waveforms results in digital waveform data streams that can be continually processed to calculate synchrophasors. The phasor calculations may be done at the point of sampling (e.g., the sensor/node), or the sampled data may be propagated to a higher functionality node (e.g., a data collection service device) in the network where the calculations may be performed.

Of note, then, the techniques may also include converting raw sensed data into useful (calibrated/converted) values, which can occur anywhere in the network, not just at the sensor (e.g., a type of "sensor virtualization"). For instance, a sensor may generally be configured to produce an output value in terms of a voltage level, a binary bit sequence, etc., based on one or more sensed characteristics (e.g., temperature). Without calibration, for example, the value created by a sensor may simply be on a relative scale (e.g., 60 on a scale of 0-128, or 3.2V on a scale of 0-5V), and then calibration scales/formulas may be used to convert that value to actual data (e.g., 20 degrees Celsius). In some instances, such conversion can be a complex process. As such, by virtualizing the sensors according to the techniques herein, such calibration and conversion may be performed by more capable devices, rather than at the (often low powered) sensors themselves.

As another example, the techniques herein may facilitate utility grid state determination. Generally, grid state determination may require several kinds of data aggregation, depending on what state elements are needed, and how they are to be determined. For example, raw instant voltage or current samples may be aggregated so that they may be processed into RMS values and analyzed for harmonic content. As another example, aggregate voltage samples taken at various points in a meter network may be used to generate a voltage profile as a function of electrical distance from a feeder. If network meters can measure real and reactive power, data values may be aggregated to determine power flows or other values at various points in the network/grid. Current and power flow data values may also be aggregated from points to feeder segments to feeder sections to substations to transmission lines to control areas.

While there have been shown and described illustrative embodiments that provide for distributed data management for sensor networks, it is to be understood that various other adaptations and modifications may be made within the spirit and scope of the embodiments herein. For example, the embodiments have been shown and described herein with relation to certain types of sensor-actuator fabrics, such as utility grids, metering networks, etc. However, the embodiments in their broader sense are not as limited, and may, in fact, be used with other types of fabrics/networks, such as industrial automation, energy management, security systems, or other specific types of "smart" networks where appropriate. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system, comprising:
   a plurality of minimalistic data collection nodes in a computer network, the minimalistic data collection nodes configured to generate sensed data values of a particular type and to communicate the data values within the computer network in substantially real-time using distributed data acquisition (DA) packets specific to the particular type of the data values;
   a plurality of capable data collection nodes in the computer network, the capable data collecting nodes configured to store the data values of the minimalistic data collection nodes from the DA packets, wherein the plurality of capable data collection nodes in the computer network each have a storage capability greater than the plurality of minimalistic data collection nodes, but lower than a dedicated storage device; and
   one or more points of use configured to request the data values, wherein one or more particular capable data collection nodes of the plurality of capable data collection nodes are configured to service the request in substantially real-time on behalf of the minimalistic data collection nodes with the stored data values provided by the DA packets sent to the one or more particular capable data collection nodes, wherein DA packets gather data across the computer network and restore the data values on the one or more particular capable data collection nodes, wherein the capable data collection nodes are configured to pull the data values from the minimalistic data collection nodes.

2. The system of claim 1, wherein the DA packets are configured to be forwarded to one or more minimalistic data collection nodes in the computer network and comprise a plurality of information content fields that receive data values from each minimalistic data collection nodes contacted by the DA packets.

3. The system of claim 1, wherein the minimalistic data collection nodes are configured to distribute the DA packets to capable data collection nodes according to one of either a broadcast protocol or a multicast protocol.

4. The system of claim 3, wherein broadcasted DA packets do not generate acknowledgment packets.

5. The system of claim 3, wherein the DA packets are distributed using a multicast tree dynamically established for the particular type of the data values.

6. The system of claim 1, wherein the minimalistic data collection nodes are configured to transmit data values according to a re-transmission timer in response to receiving a DA packet.

7. The system of claim 1, wherein the DA packets comprise an expression-based query to limit response to one or more particular minimalistic data collection nodes.

8. The system of claim 1, wherein the one or more DA packets are further configured to communicate data values to each minimalistic data collection node contacted by the DA packets.

9. The system of claim 1, wherein the data values are distributed in response to a poll from the one or more points of use.

10. The system of claim 1, wherein the plurality of capable data collection nodes are further configured to push the data values to the one or more points of use.

11. The system of claim 1, wherein the plurality of minimalistic data collection nodes are further configured to push the data values to the capable data collection nodes.

12. The system of claim 1, wherein one or more of the plurality of capable data collection nodes are further configured to generate sensed data values of the particular type and to communicate the data values within the computer network using the distributed DA packets specific to the particular type of the data values.

13. A method, comprising:
generating, by a data collection node in a computer network, sensed data values of a particular type; and
communicating the data values within the computer network in substantially real-time using distributed data acquisition (DA) packets specific to the particular type of the data values, the data values communicated to one or more capable data collection modes, wherein the plurality of capable data collection nodes in the computer network each have a storage capability greater than the plurality of minimalistic data collection nodes, but lower than a dedicated storage device;
wherein the DA packets are configured to reach one or more particular capable data collection nodes of the capable data collection nodes in the computer network that are configured to store the data values from the DA packets and to service requests for the data values from one or more points of use in substantially real-time on behalf of a plurality of data collection nodes, wherein DA packets gather data across the computer network and restore the data values on the one or more particular capable data collection nodes, wherein the capable data collection nodes are configured to pull the data values from the minimalistic data collection nodes.

14. The method of claim 13, wherein the DA packets comprise a plurality of information content fields that receive data values from each of the plurality of data collection nodes contacted by the DA packets.

15. The method of claim 13, wherein communicating comprises:
distributing the DA packets to capable data collection nodes according to one of either a broadcast protocol or a multicast protocol.

16. The method of claim 13, further comprising:
establishing a multicast tree for the particular type of the data values, wherein the DA packets are communicated using the multicast tree.

17. The method of claim 13, wherein communicating comprises:
packet transmitting data values according to a re-transmission timer in response to receiving a DA packet.

18. The method of claim 13, wherein the data collection node is a capable data collection node, the method further comprising:
receiving DA packets having the data values of the particular type;
storing the data values; and
servicing requests for the data values from one or more points of use on behalf of one or more other data collection nodes.

19. An apparatus, comprising:
one or more network interfaces to communicate within a computer network;
a processor coupled to the network interfaces and adapted to execute one or more processes; and
a memory configured to store a process executable by the processor, the process when executed operable to:
generate, as a data collection node, sensed data values of a particular type; and
communicate the data values within the computer network in substantially real-time using distributed data acquisition (DA) packets specific to the particular type of the data values, the data values communicated to one or more capable data collection modes, wherein the plurality of capable data collection nodes in the computer network each have a storage capability greater than the plurality of minimalistic data collection nodes, but lower than a dedicated storage device, and
wherein the DA packets are configured to reach one or more particular capable data collection nodes of the capable data collection nodes in the computer network that are configured to store the data values from the DA packets and to service requests for the data values from one or more points of use in substantially real-time on behalf of a plurality of data collection nodes, wherein DA packets gather data across the computer network and restore the data values on the one or more particular capable data collection nodes, wherein the capable data collection nodes are configured to pull the data values from the minimalistic data collection nodes.

20. The apparatus of claim 19, wherein the data collection node is a capable data collection node, the process when executed further configured to:
receive DA packets having the data values of the particular type;
store the data values; and
service requests for the data values from one or more points of use on behalf of one or more other data collection nodes.

* * * * *